United States Patent
Chappelle et al.

(10) Patent No.: US 11,641,383 B2
(45) Date of Patent: *May 2, 2023

(54) METHOD AND APPARATUS FOR CONTROLLING SESSIONS FROM ONE OR MORE DEVICES

(71) Applicant: RingCentral, Inc., Belmont, CA (US)

(72) Inventors: Doug Chappelle, Orlando, FL (US); Johannes Ruetschi, Boca Raton, FL (US); Jeffrey Cripe, Boynton Beach, FL (US); Ricardo De Lemos, Boca Raton, FL (US); Qiusheng Jiang, Boca Raton, FL (US); Robert Hofstetter, Greenacres, FL (US); Hashim Shafique, Delray Beach, FL (US); Keith Glasnapp, Delray Beach, FL (US); Rodrigo Pastro, Lake Worth, FL (US); Jeff McNiece, Atlantis, FL (US); Dinesh Kapani Gowda, Delray Beach, FL (US); Luiz Cesar Zaniolo, Boca Raton, FL (US); VIraj Puranik, Boca Raton, FL (US); Christian Garbin, Boca Raton, FL (US)

(73) Assignee: RINGCENTRAL, INC., Belmont, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/868,648

(22) Filed: May 7, 2020

(65) Prior Publication Data

US 2020/0267193 A1    Aug. 20, 2020

Related U.S. Application Data

(63) Continuation of application No. 15/592,580, filed on May 11, 2017, now Pat. No. 10,686,852, which is a
(Continued)

(51) Int. Cl.
*G06F 15/16*    (2006.01)
*H04L 65/1093*    (2022.01)
(Continued)

(52) U.S. Cl.
CPC ........ *H04L 65/1093* (2013.01); *G06F 3/0488* (2013.01); *G06F 3/04817* (2013.01);
(Continued)

(58) Field of Classification Search
CPC ........... H04M 3/58; H04M 2203/2094; H04M 3/42263; H04M 3/563; H04M 1/72469;
(Continued)

(56) References Cited

U.S. PATENT DOCUMENTS 5,491,743 A    2/1996    Shiio et al.
6,085,247 A    7/2000    Parsons, Jr. et al.
(Continued)

FOREIGN PATENT DOCUMENTS

CN    101064755 A    10/2007
WO    2005109829 A1    11/2005
(Continued)

OTHER PUBLICATIONS

International Search Report for PCT/US2011/058348 dated Jan. 30, 2012.
(Continued)

*Primary Examiner* — Ario Etienne
*Assistant Examiner* — Thorne E Waugh
(74) *Attorney, Agent, or Firm* — Finnegan, Henderson, Farabow, Garrett & Dunner LLP

(57) ABSTRACT

An apparatus and mechanism to manage multi-modal real-time or quasi real-time sessions such as voice, video, instant messaging, or web-conferencing across multiple devices through a simple subscription to a session management service. A user can subscribe to the service from many
(Continued)

devices (e.g. mobile device, desk phone, personal computer, internet appliance, internet TV, communication terminal, etc.) and through the service seamlessly move sessions back and forth between subscribed devices. In a preferred embodiment, a user utilizes a "virtual slider" in a simple "two touch" procedure to effectuate the movement of a communication session from one device to another device via the service.

16 Claims, 9 Drawing Sheets

Related U.S. Application Data continuation of application No. 13/879,089, filed as application No. PCT/US2011/058348 on Oct. 28, 2011, now Pat. No. 9,680,687.

(60) Provisional application No. 61/419,412, filed on Dec. 3, 2010.

(51) Int. Cl.

| | | |
|---|---|---|
| *H04M 3/42* | (2006.01) | |
| *H04M 3/58* | (2006.01) | |
| *H04L 65/1069* | (2022.01) | |
| *G06F 3/04817* | (2022.01) | |
| *G06F 3/04847* | (2022.01) | |
| *G06F 3/0488* | (2022.01) | |
| *H04L 65/403* | (2022.01) | |
| *H04M 3/56* | (2006.01) | |
| *H04N 7/15* | (2006.01) | |
| *H04M 1/72469* | (2021.01) | |

(52) U.S. Cl.
CPC ...... *G06F 3/04847* (2013.01); *H04L 65/1069* (2013.01); *H04L 65/403* (2013.01); *H04M 3/42263* (2013.01); *H04M 3/563* (2013.01); *H04M 3/58* (2013.01); *H04N 7/15* (2013.01); *H04M 1/72469* (2021.01); *H04M 2203/2094* (2013.01)

(58) Field of Classification Search
CPC ........... H04L 29/06326; H04L 65/1069; H04L 65/1093; H04L 65/403; H04L 65/1083; G06F 3/04817; G06F 3/04847; G06F 3/0488; H04N 7/15
See application file for complete search history.

(56) References Cited

U.S. PATENT DOCUMENTS

| | | | |
|---|---|---|---|
| 6,856,330 B1 | 2/2005 | Chew et al. | |
| 7,266,100 B2 | 9/2007 | Le et al. | |
| 7,386,855 B2 | 6/2008 | Song et al. | |
| 7,398,088 B2 | 7/2008 | Belkin et al. | |
| 7,444,423 B2 | 10/2008 | Shahi et al. | |
| 7,565,159 B2 | 7/2009 | Karia et al. | |
| 7,650,143 B2 | 1/2010 | Jagadeesan et al. | |
| 7,778,629 B2 | 8/2010 | Gilzean et al. | |
| 7,908,475 B2 | 3/2011 | Smith et al. | |
| 7,979,558 B2 | 7/2011 | Mahdi | |
| 7,992,163 B1* | 8/2011 | Jerding | H04N 21/47 725/100 |
| 8,018,899 B2 | 9/2011 | Oh et al. | |
| 8,027,335 B2* | 9/2011 | Ansari | H04L 65/1069 370/467 |
| 8,103,782 B2 | 1/2012 | Elleuch et al. | |
| 8,181,226 B2* | 5/2012 | Lohr | H04L 67/14 709/227 |
| 8,428,031 B2 | 4/2013 | Nylander et al. | |
| 8,606,948 B2 | 12/2013 | Evans et al. | |
| 8,725,148 B2 | 5/2014 | George et al. | |
| 8,949,435 B2* | 2/2015 | Song | H04L 65/1016 709/227 |
| 9,258,394 B2* | 2/2016 | Sobti | G06F 1/1632 |
| 9,258,523 B2* | 2/2016 | Sobti | G06F 1/1632 |
| 9,294,111 B2 | 3/2016 | Mahdi et al. | |
| 9,485,348 B2* | 11/2016 | Jeong | H04M 1/72436 |
| 10,440,073 B2* | 10/2019 | Kristiansen | H04L 65/1083 |
| 10,798,431 B2* | 10/2020 | Jana | H04L 65/1016 |
| 2002/0078150 A1* | 6/2002 | Thompson | H04M 7/003 709/227 |
| 2002/0105943 A1* | 8/2002 | Womack | H04W 72/0413 370/328 |
| 2003/0073431 A1 | 4/2003 | Dorenbosch | |
| 2005/0153198 A1 | 7/2005 | Suzuki et al. | |
| 2006/0064492 A1* | 3/2006 | Hirsch | H04L 65/1101 709/227 |
| 2006/0115067 A1* | 6/2006 | Levien | H04W 4/16 379/210.01 |
| 2006/0153198 A1 | 7/2006 | Chadha | |
| 2006/0167940 A1 | 7/2006 | Colton et al. | |
| 2007/0274292 A1 | 11/2007 | Schneider et al. | |
| 2009/0143053 A1 | 6/2009 | Levien | |
| 2010/0005094 A1 | 1/2010 | Poltorak | |
| 2010/0121961 A1* | 5/2010 | Elleuch | H04L 65/1094 709/228 |
| 2010/0131858 A1 | 5/2010 | Schultz et al. | |
| 2012/0131458 A1* | 5/2012 | Hayes | H04N 21/4788 345/173 |
| 2013/0252595 A1* | 9/2013 | Mairs | H04W 4/16 455/415 |

FOREIGN PATENT DOCUMENTS

| | | | | |
|---|---|---|---|---|
| WO | 2007118250 A2 | 10/2007 | | |
| WO | WO-2011121005 A1 * | 10/2011 | ........ | H04M 1/2535 |

OTHER PUBLICATIONS

Written Opinion of the International Searching Authority for PCT/US2011/058348 dated Jan. 30, 2012.
International Preliminary Report on Patentability for PCT/US2011/058348 dated Jun. 4, 2013.
STIC References, Dec. 17, 2015.
STIC Search Strategies, Dec. 17, 2015.

* cited by examiner

METHOD AND APPARATUS FOR CONTROLLING SESSIONS FROM ONE OR MORE DEVICES

CROSS REFERENCE TO RELATED APPLICATIONS

This application is a continuation application of U.S. patent application Ser. No. 15/592,580, which is a continuation of U.S. patent application Ser. No. 13/879,089, which is the United States national phase under 35 U.S.C. § 371 of PCT International Application No. PCT/US2011/058348, claiming priority to U.S. Provisional Patent Application No. 61/419,412, filed on Dec. 3, 2010. The entirety of U.S. Provisional Patent Application No. 61/419.412 is incorporated herein by reference. The entirety of U.S. patent application Ser. No. 13/879,089 is also incorporated by reference herein.

FIELD OF THE INVENTION

The present invention relates to communication systems and, more particularly, to a communication device and application for such a device that enables a user to control multi-modal sessions from one or more devices. Examples of communication devices may include computers, cellular phones, tablets, desktop computers, laptops, personal digital assistants, or other terminal devices that utilize one or more processors that run programs stored on memory connected to the one or more processors to permit communication services to be provided to a user.

BACKGROUND OF THE INVENTION

People often engage in communication sessions with other people in conference sessions. For instance, users may participate in group text messaging sessions, or instant messaging sessions. As another example, users may participate in conference calls that include audio or video and audio communications using phones such as cellular phones or computers. In other circumstances, a user may have a communication session that involves only communicating with one other person in a phone call or via text messaging or via a video/audio communication connection using cellular phones or computers. The connections between the users may be established over one or more networks. One example of a combined video and audio communication is a face time connection using iPhone cellular phones made by Apple. Another example of such a communication is a video conference utilizing a camera connected to a computer having a network connection with at least one other communication session participant.

A user may participate in a communication session with one or more other people via their different communication devices. In some circumstances, a user may use a non-mobile device, such as a desktop computer or desktop phone, to participate in such a session. While the session is in progress, something may occur that requires the user to move to a new location. Traditionally, that user would have to end his or her participation in that session using the desktop computer and use another device to rejoin the session. For instance, if the communication session was a conference call, the user would have to rejoin the communication session using a different device, such as a mobile phone to continue to participate in the communication session.

The leaving or reentering of the session is typically undesirable as it creates a delay in the ongoing communication session and can make other participants wait for the user to rejoin the session. In some circumstances, such an occurrence may require all the users to terminate their involvement in the session and then reinitiate a new session to accommodate the needs of that one user.

A new device or system is needed to permit a user to continue communicating in an ongoing communication session while changing the device used to participate and communicate in that communication session. Preferably, such a device permits a user to control which device is used to facilitate the user's participation in a communication session, such as a phone call, conference call, or video conference without requiring that user to terminate his or her involvement in an ongoing communication session or rejoin that session using another device.

SUMMARY OF THE INVENTION

A communication system is provided that includes a server, a first communication device associated with the server and a second communication device associated with the server. The first communication device is engaged in a communication session with at least one other communication device. The second communication device communicates with the server to move the communication session from the first communication device to one of the second communication device and a third communication device associated with the user such that the second or third communication device replaces the first communication device in the communication session via the server. The at least one other communication device and the second or third communication device are connected to participate in the communication session after the communication session is moved via the server.

The first, second and third communication devices may each be one of a cellular phone, a mobile phone, a desktop phone, a computer, a mobile computer device, a laptop, or a television. The server may be one or more computer devices that are connected to the first and second communication devices via one or more network connections. The server may also be connected to the third communication device via a network connection. The server may offer a service and have one or more databases that associate the user with the first and second communication devices.

In some embodiments of the system, the server may periodically receive location data from the first and second communication devices that identify the locations of the first and second communication devices. The server may also periodically receive location data from the third communication device that identifies the location of the third communication device. The location data may be geographical location data or an address, such as a routable IP address or other address that is usable for contacting or connecting with a communication device.

Preferably, the second communication device is able to effectuate a move of the communication session via the server after receiving two discrete and separate inputs from a user. The first and second inputs my be effected by a user touching a display of the second communication device or by otherwise providing input via one or more input devices to the second communication device.

A method for controlling a communication session is also provided. The method may include the steps of providing a server that hosts a service and offering an application for download to at least one communication device. A plurality of communication devices may be subscribed to the service. Each of the communication devices may be associated with a user. The server may receive a communication from one of the communication devices that request an ongoing and active communication session between a first communication device and another communication device be moved so that the first communication device participating in the communication session is replaced by the second or third communication device associated with the user. The server may move the communication session from the first communication device to the second or third communication device so that the communication session remains ongoing but is between the second or third communication device and the other communication device after the communication session is moved.

Moving of the communication session preferably occurs seamlessly. The communication session may be automatically answered at the target device. The communication session may be seamless because there is no interruption in the media path defining the connection with the other communication device and the connected party or parties may not see a change in the display provided by their communication device. Further, no user action may be required on the target device by the moving user.

Some embodiments of the method may include the second communication device receiving a first input and a second input. The first input may elect the communication session to be controlled by the user and the second input may indicate that the communication session should be moved from the first communication device to the second communication device. The second communication device may then send that communication to the server for moving the communication session based on the second input and in response to that received second input.

Embodiments of the method may also include steps occurring after the communication session is initially moved. For instance, the server may receive a communication from the third communication device requesting that the ongoing and active communication session between the second communication device and the other communication device be moved so that the second communication device is replaced by the third communication device. The server may then move the communication session. Alternatively, the second communication device could send a communication requesting the moving of the session to the third communication device and the server could move the session to the third communication device. As another alternative, the first communication device could send a communication requesting the moving of the session from the second communication device to the third communication device or the first communication device and the server could move the session to the first or third communication device.

A method of controlling a communication session is also provided that includes the steps of providing a server hosting a service, offering an application for download to at least one communication device and subscribing a plurality of communication devices to the service. The communication devices comprise a first communication device and a second communication device. The plurality of communication devices are associated with a user. The server receives a communication from the second communication device requesting an ongoing and active communication session between the first communication device and another communication device to be moved so that the first communication device participating in the communication session is replaced by another one of the plurality of communication devices associated with the user. The server moving the communication session from the first communication device to another one of plurality of communication devices associated with the user so that the communication session remains ongoing but is between the another one of the communication devices associated with the user and the other communication device after the communication session is moved.

A communication terminal is also provided. The communication terminal may include a display unit, a memory unit, a transmission unit, and a processing unit. The processing unit may be connected to the display unit, memory unit, and the transmission unit. The processing unit may run an application stored on the memory unit so that the communication terminal provides a display via the display unit to illustrate at least one active communication session ongoing between a first communication device and another device in response to a receipt of a first input. The display also displays at least one of an indicator for a second communication device to which the communication session is moveable and an indicator for the communication terminal to which the active communication session is moveable. The processing unit may send a message to at least one of a server, the first communication device, and the second communication device via the transmission unit in response to receiving a second input. The message may request that the communication session be moved from the first communication device to one of the second communication device and the communication terminal to effectuate a move of the communication session from the first communication device to the second communication device or the communication terminal.

The communication terminal, first communication device and second communication and any other communication device may be communication endpoints. Examples of such endpoints are mobile phones, cellular phones, mobile computer devices, laptops, desktop computers, personal computers, televisions, and desktop phones.

A non-transitory computer readable medium is also provided. The medium may have an application stored thereon that defines instructions that are executable by a processor of a communication device. The instructions may define a method that includes the steps of displaying an indicator identifying an active communication session between a first communication device associated with a user and another communication device, displaying an indicator identifying the first communication device and a second communication device associated with the user that is available for participating in the active communication session to replace the first communication device, and sending a message to a server to request that the active communication session be moved from the first communication device to the second communication device in response to receiving input identifying the second communication device.

Embodiments of the non-transitory computer readable medium may be memory of the second communication device, memory of the first communication device, flash memory, a DVD, a compact disc, or other storage medium.

In some embodiments of the medium, the method defined by the instructions may further comprise periodically sending location data to the server to identify a location of the communication device running the application. Additionally, the method defined by the instructions could include other steps similar to the above referenced method steps, which are also discussed in more detail below with regard to the exemplary embodiments discussed below.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for controlling sessions from one or more devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Embodiments of our communication device may include an application stored on memory of the communication device so that one or more processors of the communication device may run the application stored in the memory. The memory that contains the application may be non-transitory memory. The communication device may be considered a terminal, an endpoint, a terminal device or a communication terminal device.

Figure 1:
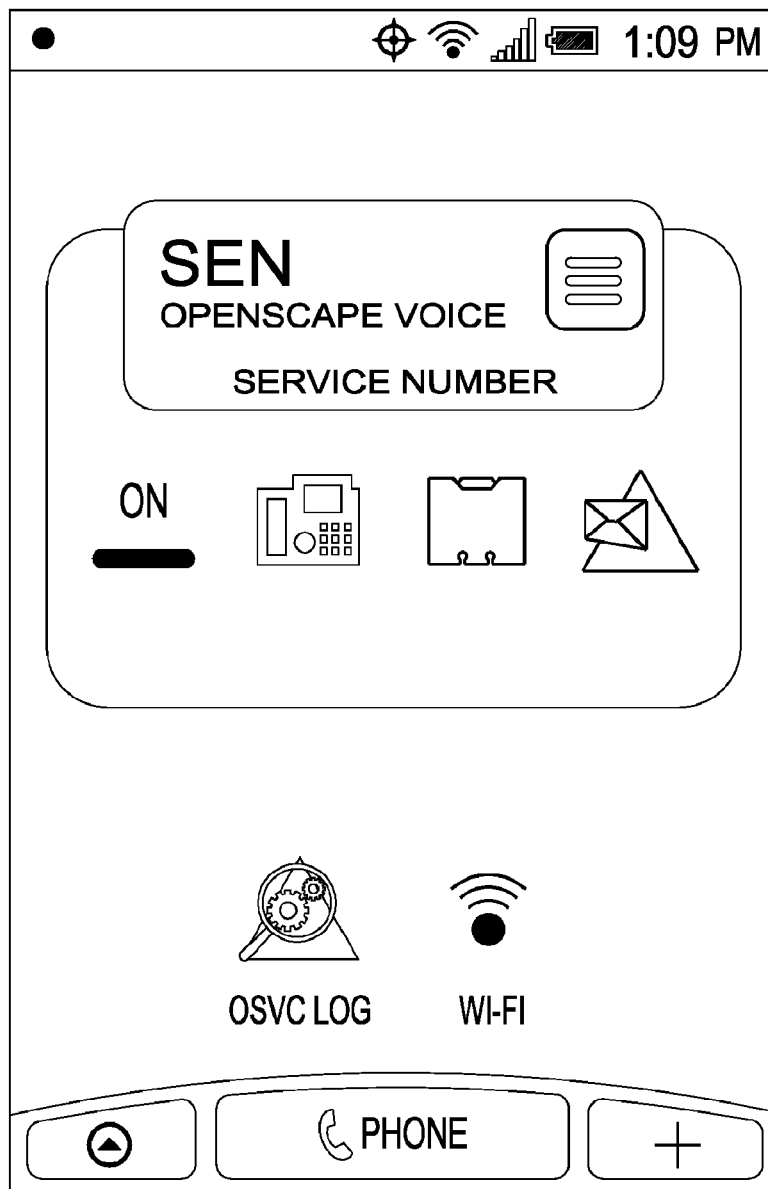
FIG. 1 is a front view of a first present preferred communication device illustrating the display of the device showing a session indicator provided by a widget being operated by the communications device that has an interface displayed via the display of the device.
Figure 1A:
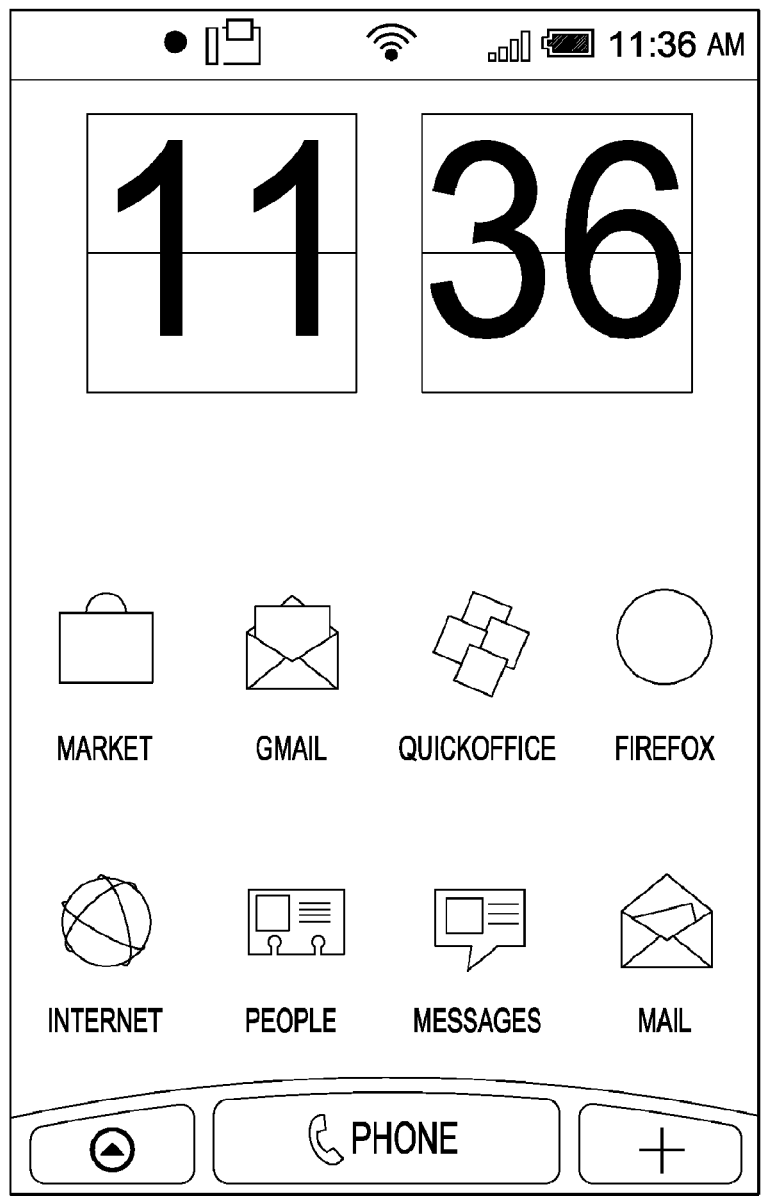
FIG. 1A is a front view of the first present preferred communication device illustrating the display of the device showing a session indicator provided by an application being operated by the communications device that has an interface displayed via the display of the device. It should be appreciated that the session indicator may be located in a status bar portion of the display of the device.
Figure 1B:
FIG. 1B is a front view of the first present preferred communication device similar to FIG. 1A, which illustrates the display of the device showing a session indicator provided by an application being operated by the communications device that has an interface displayed via the display of the device.
Figure 2:
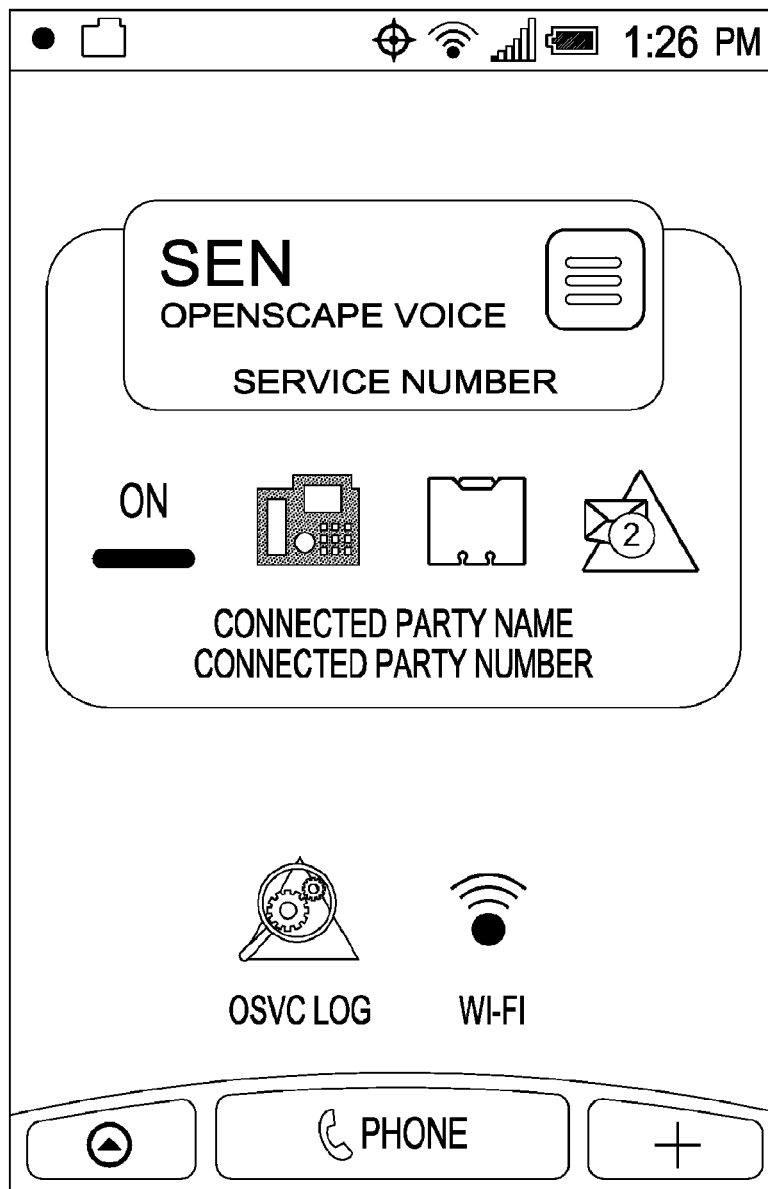
FIG. 2 is a view similar to FIG. 1, of the first present preferred communication device illustrating the session indicator being updated to reflect that at least one session is established.
Figure 2A:
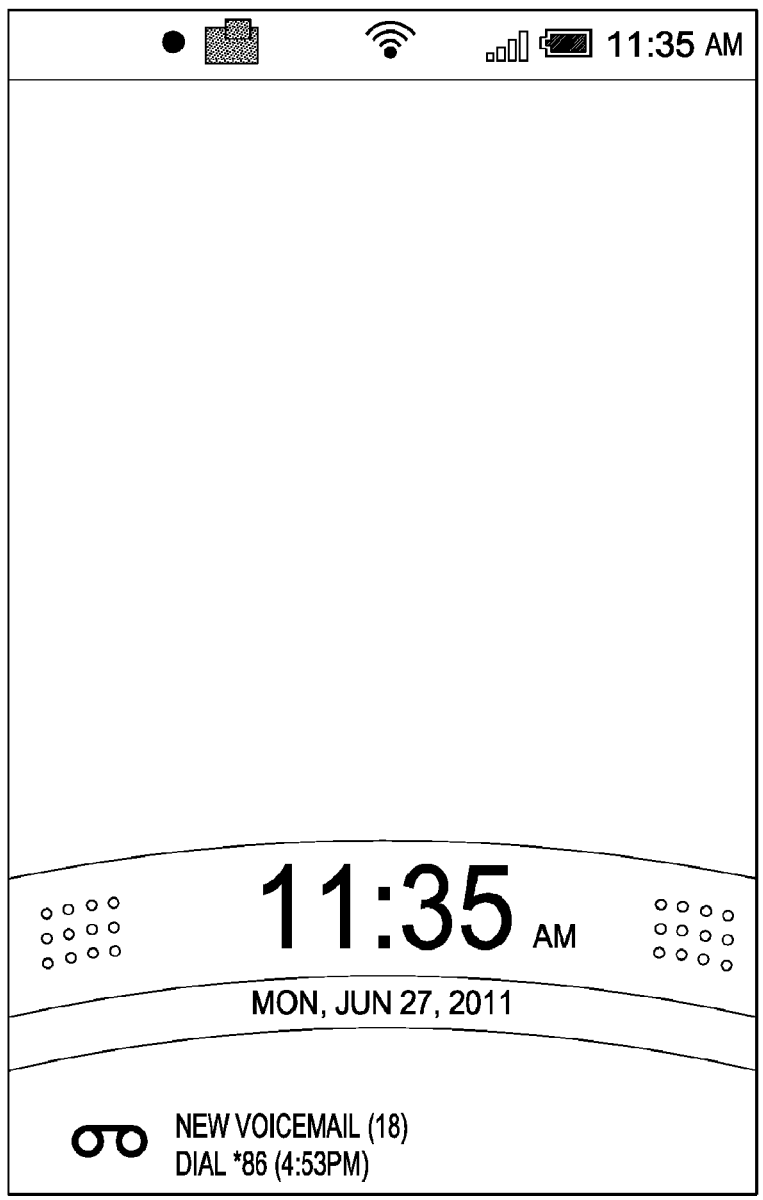
FIG. 2A is a view similar to FIG. 1A of the first present preferred communication device illustrating the session indicator being updated to reflect that at least one session is established.

The application may be configured so that a device running the application can provide or help provide a communication session management service that enables a user to control multi-modal sessions from one or more devices when run on the communications device via one or more processors of that device. Preferably, the application is configured so that a user interface is displayed to a user via the screen or display of the communications device running the application. An example of such a display may be seen in FIGS. 1, 1A, 1B, 2, and 2A, which illustrate a display showing whether any active communication sessions are in progress. In FIGS. 1, 1A, and 1B the display has an indicator that has a first color to illustrate no session is in progress and in FIGS. 2 and 2A the display shows the indicator in a different color to show that a communication session is active, or in progress. The icon may be shown in a background of the display or may be shown in a status bar provided at a top, bottom, or side of the display. Alternatively, the indicator may be an icon that is displayed on a screen that is made visible to a user. The icon may be displayed one way when there is not an active communication session using one or more registered devices and maybe displayed differently to indicate that a communication session is active, such as by periodically blinking when an active session is in progress. As other alternatives, a different icon or a change in shape of the same icon could be used to indicate a session is active.

Figure 3:
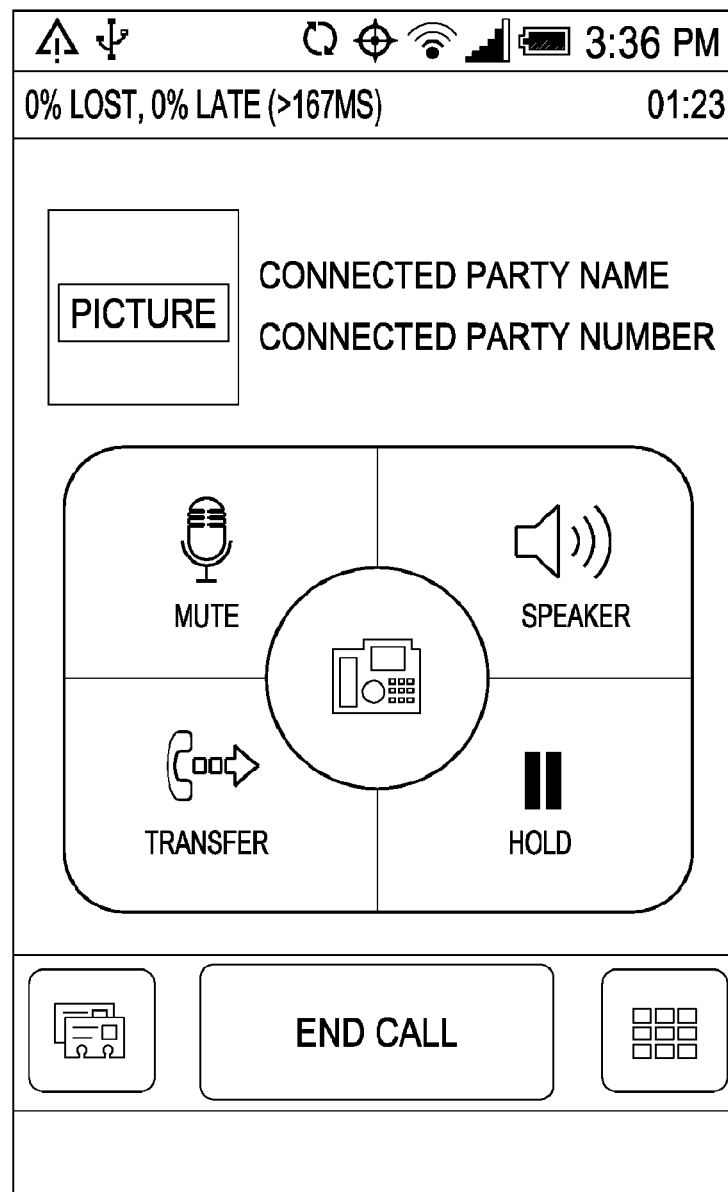
FIG. 3 is a view similar to FIGS. 1, 1A, 1B, and 2 illustrating one example of how a display of a communication device may present different indicia to a user to permit the user to select an active communication session for controlling that communication session.
Figure 4:
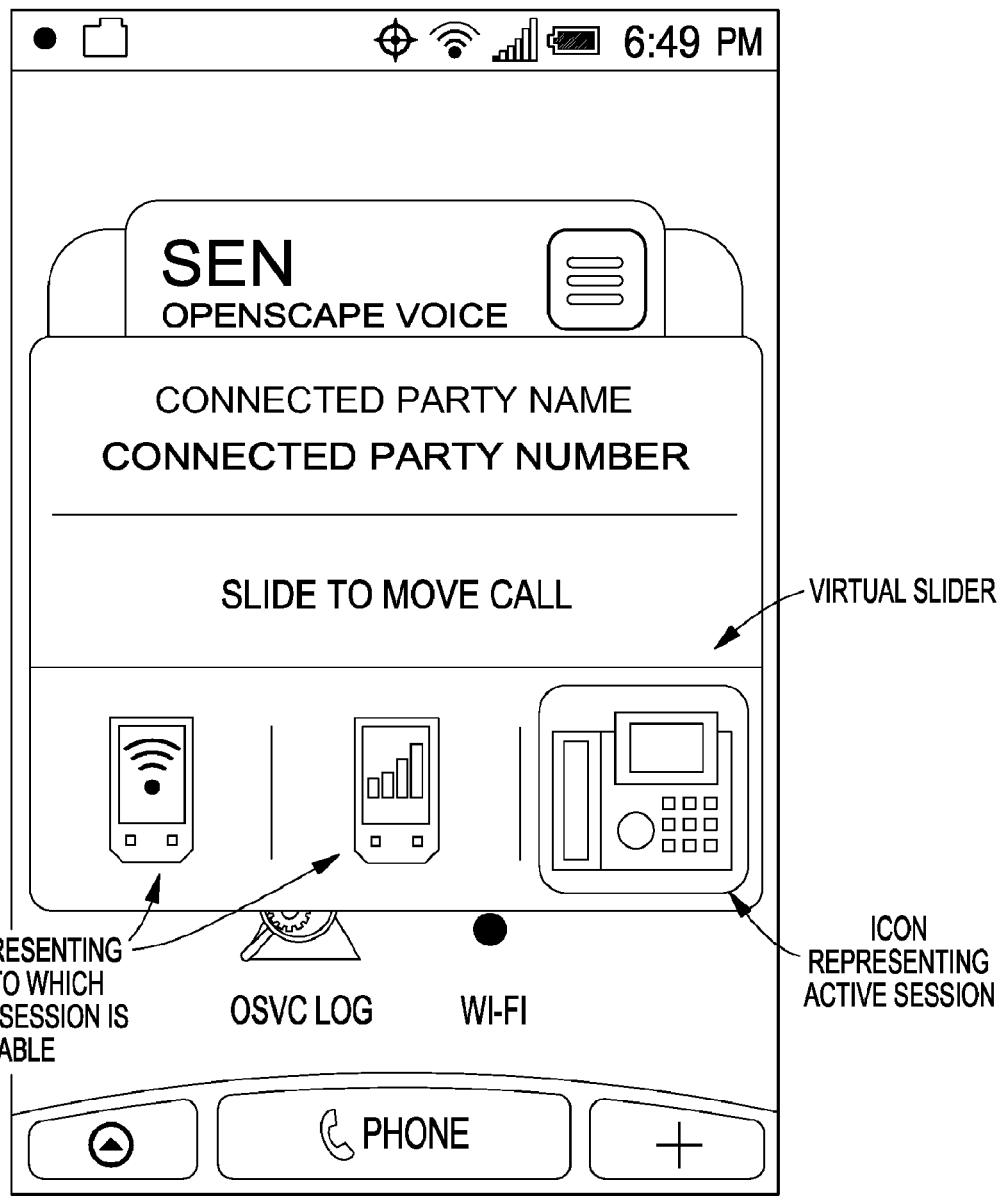
FIG. 4 is a view similar to FIGS. 1, 1A, 1B, 2 and 3 of the first present preferred communication device illustrating the display of indicia to a user that may be utilized to permit the user to provide input to the device to control a session via the communications device. The user may provide input to the communications device to cause the communications device to adjust how a communication session is controlled. For instance, the user may provide input by touching the display of the communications device to have an ongoing session using another communications device moved so that another device takes over the handling of the session so that the user may begin using that other device to continue communicating via the ongoing session.
Figure 4A:
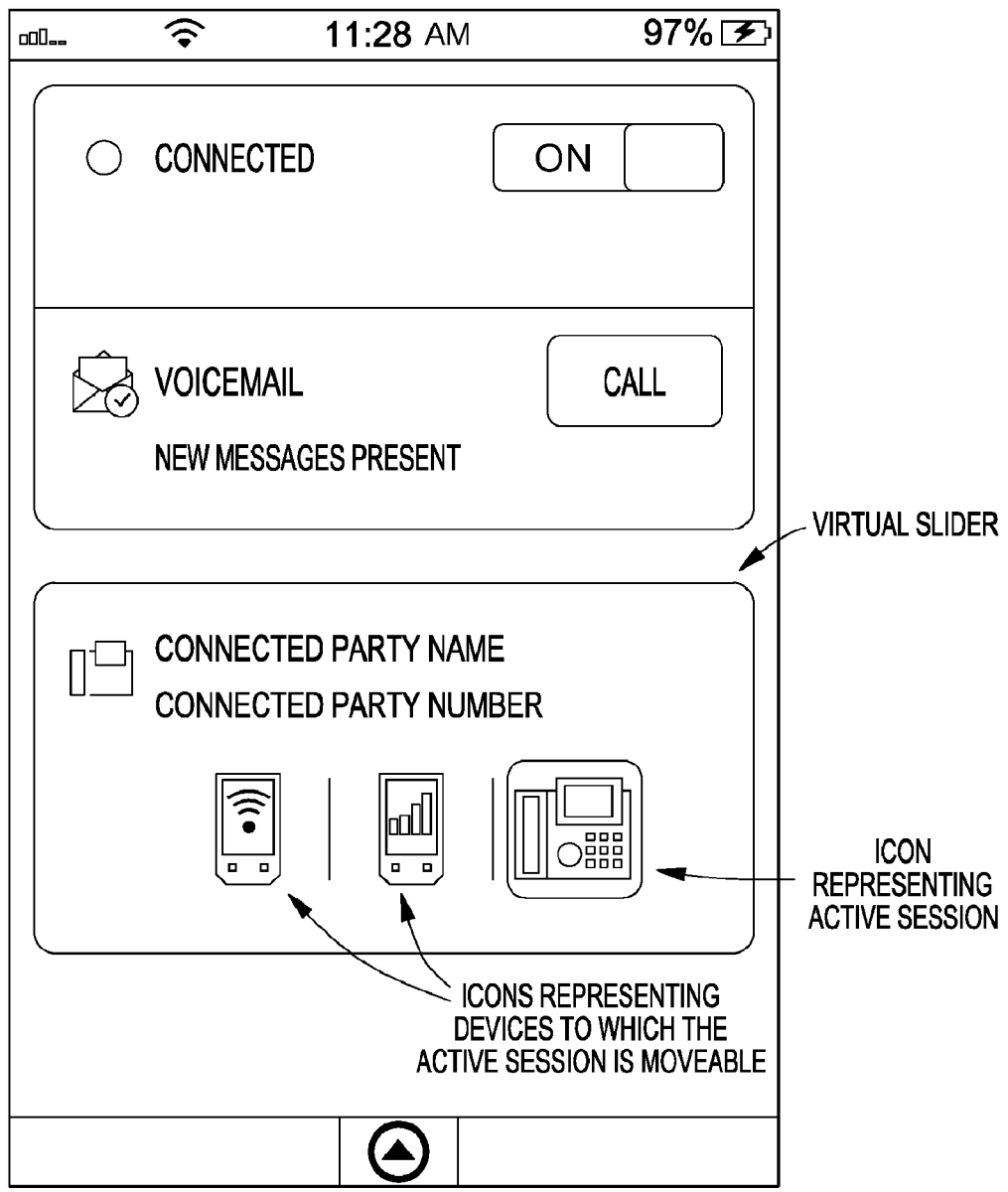
FIG. 4A is a view similar to FIG. 4 of the first present preferred communication device illustrating another type of display of indicia to a user that may be utilized to permit the user to provide input to the device to control a session via the communications device.

Preferably, the interface that is displayed may be configured to utilize a virtual slider that may be moved by a user using a finger to press on the display screen and slide his or her finger along that screen to provide input to the application to effectuate a moving of a communication session. For instance, as may be appreciated from FIG. 3 a user may touch an icon shown on the screen of the device or click that icon shown on the display of a device using a mouse, a remote control, or other input device to identify an active session that the user would like to move from one device to another device. The touching of that icon may evoke the application to cause the communications device to display a virtual sliding mechanism that may be touched and manipulated by the user via the screen of the device to permit the user to provide input by sliding his or her finger along the screen of the device from one icon to another icon to move the session to another device. The sliding of the user's finger may move from adjacent one icon representing a device currently handling an active communication session to another device the user wants to which the user wants to move the communication session. For instance, the display of the communication device may subsequently show a virtual slider mechanism that a user may press a finger on and slide a finger along to actuate movement of the session to the other device as may be understood from FIG. 4. As another alternative, a user may touch the portion of the screen on which an icon representing an active communication session being handled by a first device and move his or her finger on the screen to another icon representing another device, such as a cell phone, to effectuate a move of the active communication session, as may be appreciated from FIG. 4A. The provided input may be configured to cause the communication device to cause an active communication session to be moved from one device to another seamlessly so that the user may continue to participate in the communication session, but use a different device to participate in that ongoing communication session. The different device may replace the device originally used by the user to participate in the ongoing communication session. The seamless moving of the communication session may occur so that there is no interruption in the media path defining the connection with the other communication device or devices involved in the active communication session and the connected party or parties may not see a change in the display provided by their communication device(s) when or after the communication session is used to another device associated with the user. Further, no user action may be required on the target device by the user providing the input to effectuate the move of the active communication session.

For example, a user that is participating in a video conference call from her personal computer at work may simply use the application on another communication device, such as a cellular phone, to move the video call from her computer to her cellular phone by using her cellular phone as the controlling device to seamlessly move the communication session to the cellular phone via the application so that the cellular phone replaces the personal computer in the communication session. If the cellular phone does not provide video call services, the moving of the communication session to the cellular phone may also act to adjust the scope of communications transmittable by the user from video and audio to just audio. This will occur when, the conference connection provided to the user via the cellular phone only permits audio communications to occur in the communication session after the handling of the session is moved to the cellular phone.

The user's cellular phone may be configured to permit the user to control which device is used to participate in an ongoing communication session by utilizing an interface that only requires relatively simple input from the user. For instance, a communications device may utilize a touch screen that displays an icon that may be slid by a user touching the icon and sliding the icon on the screen or sliding his or her finger from an icon representing one device to an icon representing another device to control which communication device handles a communication session. For instance, a user may utilize a virtual slider to move a video call from a personal computer to a voice call on a mobile phone without requiring any other user actions such as dialing or answering the call on the mobile phone.

Of course, the user may utilize the same procedure for using the communication device to move the handling of a session back to the personal computer or to anther device. For instance, the user may again use the "virtual slider" to actuate movement of the voice call from the mobile phone to a video call handled by a high definition TV connected to a camera, or a video call handled by a personal computer device configured for supporting video calls via a microphone and camera connected to the computer.

The application on the communication device may permit the communication device to communicate with a session management service to automatically detect a proximity between other devices, such as televisions or computers and permit the communication device to add the television or computers as an available device for the communication sessions. Then the user may seamlessly move the communication session to the television, computer, or other newly available device by utilizing the virtual slider mechanism. For instance, after the television is detected by the communication device and added as a device that may handle a communication session, the user may use the application on the communication device to actuate the slider by causing the slider to move from an icon representing his communication device to an icon representing the television to move a communication session to the television. This functionality may enable the user to seamlessly move or "slide" the call from the cellular phone to the television.

In some embodiments, the communication device may be configured to only provide a display of icons representing other communication devices that are detected as being within a predetermined proximity of the communication device as being available for moving an active communication session. A user may then be limited to only sliding a call from one device to another device that is detected as being within this predetermined distance. The predetermined distance may be any of a number of different preselected distances, such as three meters, five meters, or thirty meters.

Subscription to the session management service may be done by downloading the client application from a public or private application store accessible via a network connection, such as an internet connection, to a communication device. When the application is downloaded onto the device and subsequently installed, the application may be run by the device so that the user may utilize the device to subscribe to a service utilizing a sign-in procedure with a user account, and password. The sign-in procedure may be provided via a connection formed over a network between the device and a server hosting the service. A user may supply input to the device for communicating to the server. The input may include data that identifies a user account and user access code, such as a password. The service may be configured so that no further information is necessary to be entered by the user for use of the service via the application run by the communication device. The sign in procedure at the device may utilize communications with the server hosting the service so that the device is automatically provisioned for the service and enabled to be used to make, receive, or move multi-modal real-time sessions via the service.

Examples of embodiments of the application that may be utilized in a communication device includes applications that define a user interface for a screen of the communications device. The application may be a widget which may be implemented as a Microsoft Windows operating software gadget, an Android operating software widget, an Apple OS X operating software dashboard widget, or other type of widget program that is operable on a communication device. The application may be configured to cause the device to display an indicator to show if there is an active communication session on one of the devices the user used to sign in to the service so that the communication session may be managed by the user for moving communication sessions to other devices that were signed in to the service by the user.

If a user wants to manage an active session, he or she may do so by touching the screen of the communication device or otherwise providing input to the communication device to select an icon representing the active communication session. The user may do this, for example, by actuating the application to provide a display showing the active session as an icon representing the device currently handling the session as well as other devices that may handle that communication session. The user may effect a move of the communication session to another device by providing input to the communications device to move the communication session to another device. The user may provide such input, for example, by using his or her finger to press on the icon representing the active communication session on a current device and sliding the finger to another icon representing another device. The use of such a "virtual slider" can provide the input to the communications device to cause the communications device to effect a movement of the communication session from the current device to the other user selected device via communications with the service hosted by the server. It should be appreciated that the communications exchanged between the communication device and the server hosting the service may be performed by an exchange of messages that are based on the input received by the user to effectuate the moving of the communication session to the desired device.

The application may be configured so that the display of the communications device may show a number of optional devices to which communication session may be moved when the application is being run by the communications device. The devices shown via the display may include: the device with the active session and any devices that may be within the user's proximity. It should be understood that the devices may be shown as indicia, such as icons that represent the different devices or may be shown as other types of indicia such as words or text that represent or correspond to the devices.

In some embodiments, a communication device that was subscribed to the session management service can publish location data to the service which in turn can be queried by the other devices. Location data can be based on wireless access point, IP address, IP subnet, GPS data, mobile service provider, or other data. Subscribed devices may publish their location data by communicating that data to one or more servers that host the service. The location data may be communicated on a periodic basis or based on predetermined time intervals, such as any time the device is activated, or after a certain time period has been passed since the last time the device transmitted such data.

The location data of the devices may also or alternatively be provided to the service in response to a query sent by one or more servers hosting the service. The queries may be sent at predetermined time intervals or on a periodic basis. The location data obtained by the service may be used to identify when a particular device is within a predefined distance or a certain proximity of other devices for moving a communication session to those devices. The service may send one or more messages to a communication device that informs the communication device of the proximity of other devices based on the last known location of those devices.

Figure 5:
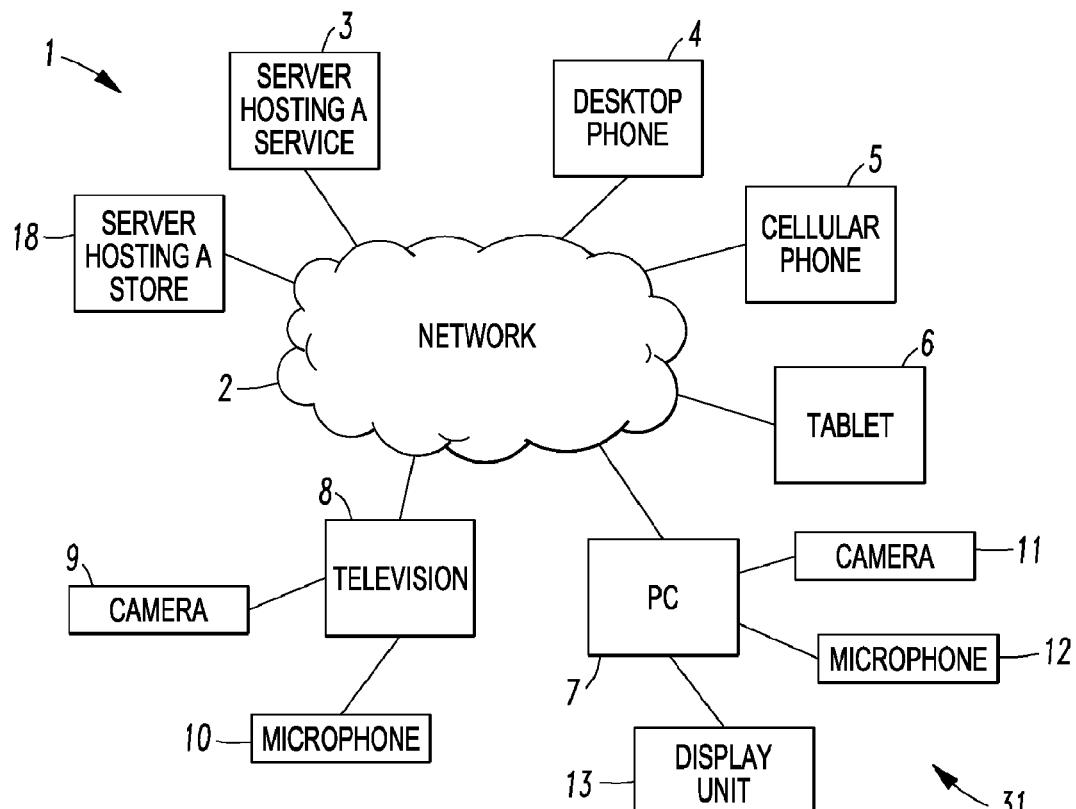
FIG. 5 is a schematic diagram showing a present preferred communication system.
Figure 6:
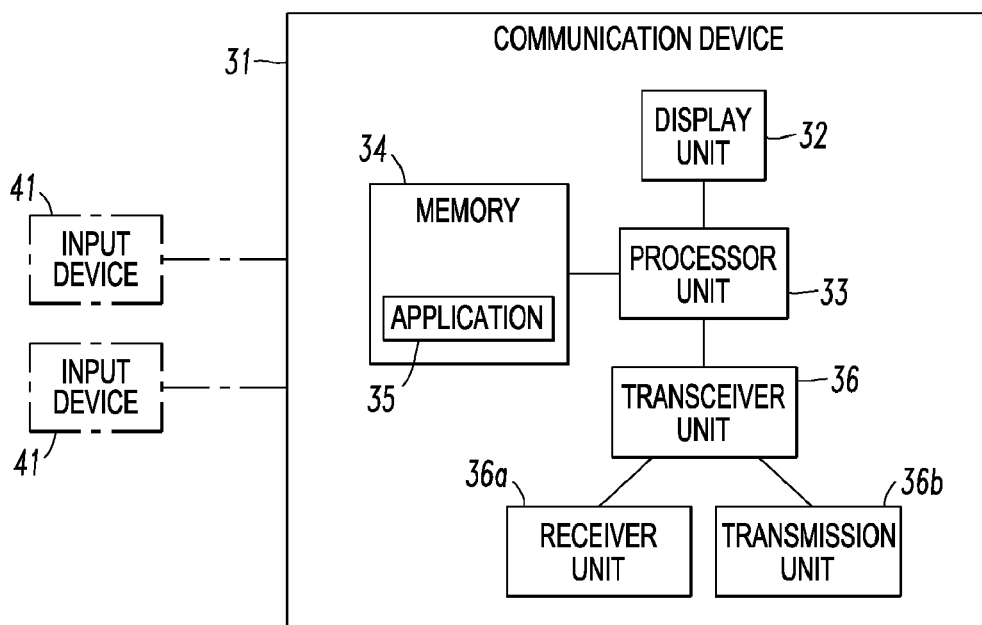
FIG. 6 is a block diagram of a present preferred communications device.

Referring to FIGS. 5-6, a communication system 1 may be configured to include a service offered by one or more servers 3. The service may be accessible via a network 2 by multiple different communication terminal devices 31. The communication terminal devices may be Session initiation Protocol ("SIP") endpoints or other types of endpoints. Each of the communication terminal devices may include a housing that has a display unit 33 that is connected to the processor unit 32 of the communication terminal device 31. Alternatively, the display unit 33 may be a separate device connected to the processor unit 32. An example of such an embodiment may be a desktop computer. The display unit 33 may include a monitor or a liquid crystal display.

The processor unit 32 may be connected to the display unit 33, memory 34, and a transceiver unit 36. The memory 34 may include interconnected memory or one or more memory units connected to the processor unit. The processor unit 32 may include a microprocessor or multiple interconnected microprocessors or other types of processing units. The transceiver unit 36 may include a receiver unit 36a and a transmission unit 36b. One or more input devices 41 may be connected to the terminal device so that a user may provide input to the device. Of course, the display may be a touch screen that is configured to receive input via touching of the display unit 33 by a user as well.

The service hosted by at least one server 3 may be accessible via an internet connection to a number of communication terminal devices associated with the same user, such as a tablet 6, cellular phone 5, desktop phone 4, personal computer 7 and television 8. The television 8 may be connected to periphery devices such as a camera 9 and microphone 10 so that the television may be used for video communication sessions such as phone calls or video and audio communication sessions. The personal computer 7 may be a desktop computer that is connected to a camera 11 and microphone 12 and a display device 13, which may be a monitor or liquid crystal display, for example. The personal computer may be connected to the periphery devices so that those devices may be utilized by the computer to provide audio and video communication sessions to a user. The computer may also be connected to one or more input devices (not shown), such as a mouse or keyboard for providing input to the computer. The television 8 may be connected to a remote control (not shown) to receive input from a user.

The desktop phone 4 and cellular phone 5 may include a screen and a keypad for displaying output and receiving input. The cellular phone may have a touch screen so that a user may provide input by touching or pressing on the screen. The tablet 6 may also include a touch screen or may be connected to input devices for receiving input from a user. The tablet may have a screen for displaying output to a user. The cellular phone 5, desktop phone 4 and tablet 6 may each include one or more cameras to provide video communication capabilities in addition to any audio communication functionality offered by one or more microphones and one or more speakers of those devices.

A user may download an application from a server 18 that hosts a store that offers applications for different types of devices. The application may be downloaded and installed on each of the communication terminal devices, such as the tablet 6, the cellular phone 5, the desktop phone 4, the personal computer 7 and the television 8. The application may be stored on memory of each device so that a processing unit of each device may run the application stored on its memory. Examples of how a device may be subscribed to the service via the application may be appreciated from U.S. Provisional Patent Application No. 61/419,400. The entirety of U.S. Provisional Patent Application No. 61/419,400 is incorporated herein by reference.

The server 3 that hosts the service may maintain a database or communicate with a database that associates the user by a user name or other code with the devices owned by the user, such as the tablet 6, the cellular phone 5, the desktop phone 4, the personal computer 7 and the television 8. The server may communicate with each communication device to obtain that device's location and communication session status. The device's location may be identified by the device's network address, such as an IP address, by physical geographic coordinates, or by reference to a distance away from one of the other communication devices. For instance, the cellular phone 5 may be the reference point and each of the other devices' location may be identified as being a certain distance and direction away from the cellular phone 5. Some devices such as a desktop phone may have a fixed location which is stored in the database.

A user may seek to control a communication session using any of the different communication devices via the application running on those devices. If a user is involved in an active communication session using the television 8, for example, the service hosted by the one or more servers 3 may communicate with the television 8 so that the active communication session is displayable on the screen of the television. The user may utilize this display to initiate a move of the communication session to the user's cellular phone 5 or tablet 6. For instance, the user may provide input to the television to select an active communication session identified via the application causing a display of such an active session. The selected session may then be displayed on the screen of the television along with other devices to which the communication session may be moved. The other devices that are displayed may be displayed based on information provided to the television 8 via the server 3 identifying the other available communication devices the user may select. Such information may be provided to the user along with the information concerning active communication sessions or may be provided to the communication device after an active communication session to be managed is selected by a user.

A user may then select one of those other devices by selecting an icon of that device displayed on the television screen using an input device, such as a remote control. That selection of the new device may be communicated to the service so that the selected device may then receive the ongoing communication session from the service to handle the ongoing communication session via the service offered by the one or more servers 3. For instance, if the user selected an icon representing the cellular phone 5, the communication session may be moved while ongoing to the cellular phone. If the cellular phone is not equipped for audio and video communication, the communication session handled by the cellular phone may be limited to only audio communications. After selecting the cellular phone 5 to which the active communication session should be moved, the at least one server hosting the service may cause transmissions related to the communication session to be routed to the cellular phone 5 so that the cellular phone replaces the television in the ongoing communication session.

Thereafter, if the user desires to move the ongoing communication session back to the television 8, the user may again actuate the active communication session by selecting a displayed icon representing that session on the display of his cellular phone 5. That icon may be displayable on the screen of the cellular phone 5 based on data the cellular phone 5 received from the one or more servers 3 of the service identifying active communication sessions being handled by devices associated with the user. The user may make such a selection by touching the screen where the icon representing the active communication session is shown or by utilizing a keyboard or other input device of the cellular phone 5. Thereafter, the user may select a new device, such as the television 8, to which the ongoing communication session is to be moved by selecting an icon displayed on the screen of the cellular phone representing that device. That selection may be communicated to the service to actuate the at least one server 3 of the service to move the communication session back to the television 8. The moved communication session may be only in audio or may utilize video and audio communications via the peripheral devices connected to the television, such as the camera 9 and microphone 10.

As another example, a user may be engaged in an active chat session using a messenger communication service using the tablet 6. The user may subsequently desire to move the chat session to his personal computer 7 so that files stored on memory local to the personal computer 7 may be shared via the chat session. The service may have communicated the active chat session ongoing to the personal computer 7 so that a user may go to the personal computer to select the active chat session associated with the tablet 6 and move that chat session to the personal computer 7 by selecting the computer 7 as the destination to which the chat session should be moved. The service may subsequently receive that selection and effectuate the move of the chat session to the computer 7 so that the user may continue participating in the chat session utilizing the personal computer 7 instead of the table 6. In so doing, the service may control all of the signaling needed to effectuate the move of the communication session to ensure the move of the communication session is seamless. The signaling may be performed in accordance with any of a number of suitable protocols, such as Session Initiation Protocol ("SIP"). After the communication session is moved to the personal computer 7, files stored locally on the personal computer may subsequently be shared via the chat session so that other devices of other users participating in the chat session may receive copies of the shared files.

It should be understood that the moving of communication sessions may occur similarly to the examples provided above between any of the cellular phone 5, tablet 6, desktop phone 4, personal computer 7 or television 8. Any of devices may initiate a moving of a communication session between one of these devices to another one of these devices. For instance, a first one of these devices associated with a user may initiate a move of a communication session from a second one of these devices associated with the user to a third one of these devices associated with the user, from that first device to another device associated with the user, or from another device associated with the user to that first device. Preferably, the communication sessions are moved so that other participants in the communication session are unable to notice or detect the fact that a user moved the communication session to another device. That being said, if a user moved a communication session so that the user was no longer able to communicate via video, but only by audio, such a move may be noticeable by others.

It should be appreciated that embodiments of the communication system and communication device discussed above may be modified to meet different design objectives. For instance, the connectivity between a communication device and the service hosted by one or more servers may be direct or through multiple hops. For instance, a communication device may communicate to the server hosting the service by sending messages to an access point to be forwarded to the server through one or more gateways or other nodes within one or more networks. It should be understood that the access point may be, for example, a router, a base station, or a switch. The connectivity may be automatically determined based on an automatic configuration mechanism of the device.

Embodiments of the present invention may help eliminate complications so that a user may more easily use his or her devices for engaging in communication sessions. For instance, a user need not know any device addresses or numbers for configuring the other devices the user may have to utilize embodiments of the invention. The user need only to download and install the application on multiple devices for associating those devices with the user. Upon installing the application, the user may only have to enter the user sign-on code and password for associating his device and having the association stored and recognized by the service. Further, when moving a communication session, a user need not use a device for rejoining any communication sessions or taking other time consuming steps that create noticeable delays to communication session participants when moving a communication session.

It should be appreciated that the above discussed embodiments further provide a user with the ability to effectuate a move of a communication session from one device to another device using a simple and easy to use process. In some embodiments, a user need only utilize two selections to quickly and easily effectuate a move of a communication session.

While certain present preferred embodiments of the communication device, communication system, and methods of making and using the same have been shown and described above, it is to be distinctly understood that the invention is not limited thereto but may be otherwise variously embodied and practiced within the scope of the following claims.

What is claimed is:

1. A computer-implemented method for managing communications, comprising:
   detecting one or more available devices during an active communication session using one or more locations of the one or more available devices;
   displaying, on the one or more available devices, one or more device indicators corresponding to the detected one or more available devices during the active communication session;
   receiving, from an available device of the one or more available devices, an input selecting one of the displayed one or more device indicators, during the active communication session;
   causing to display a session identifier corresponding to the active communication session at a selected device associated with the selected one of the displayed one or more device indicators; and
   in response to receiving a session selection input from the selected device, routing transmissions related to the active communication session to the selected device.

2. The computer-implemented method of claim 1, further comprising:
   in response to receiving the device selection input, causing a device indicator corresponding to the selected device to change.

3. The computer-implemented method of claim 1, further comprising:
   receiving proximity information corresponding to one or more additional available devices;
   causing to display one or more device identifiers corresponding to the one or more additional available devices during the active communication session; and
   wherein routing the transmissions to the selected device comprises routing the transmission to one of the one or more additional available devices.

4. The computer-implemented method of claim 1, further comprising:
   in response to receiving the device selection input, determining media capabilities of the selected device; and
   wherein routing transmissions related to the active communication session comprise routing transmission based on the media capabilities of the selected device.

5. The computer-implemented method of claim 1, further comprising:
   receiving location data corresponding to the one or more locations of the one or more available devices.

6. The computer-implemented method of claim 1, wherein routing transmissions related to the active communication session comprises routing audio data, video data, or text data.

7. A non-transitory, computer-readable medium, storing instructions that, when executed by a processor, cause:
   detecting one or more available devices during an active communication session using one or more locations of the one or more available devices;
   displaying, on the one or more available devices, one or more device indicators corresponding to the detected one or more available devices during the active communication session;
   receiving, from an available device of the one or more available devices, an input selecting a device indicator from the displayed one or more device indicators, during the active communication session; and
   displaying a session identifier corresponding to the active communication session at a selected device associated with the selected one of the displayed one or more device indicators;
   in response to receiving a session selection input from the selected device, routing transmissions related to the active communication session to the selected device; and
   causing the selected device indicator to change.

8. The non-transitory, computer-readable medium of claim 7, storing further instructions that, when executed by the processor, cause:
   receiving proximity information corresponding to one or more additional available devices;
   displaying one or more device identifiers corresponding to the one or more additional available devices during the active communication session; and
   wherein routing the transmissions to the selected device comprises routing the transmission to one of the one or more additional available devices.

9. The non-transitory, computer-readable medium of claim 7, storing further instructions that, when executed by the processor, cause:
   in response to receiving the device selection input, determining media capabilities of the selected device; and
   wherein routing transmissions related to the active communication session comprise routing transmission based on the media capabilities of the selected device.

10. The non-transitory, computer-readable medium of claim 7, storing further instructions that, when executed by the processor, cause:
    receiving location data corresponding to the one or more locations of the one or more available devices.

11. The non-transitory, computer-readable medium of claim 7, wherein the transmissions related to the active communication session comprise audio data, video data, or text data.

12. A system, comprising:
    a processor;
    a memory operatively connected to the processor and storing instructions that, when executed by the processor, cause:

detecting one or more available devices during an active communication session using one or more locations of the one or more available devices;

displaying, on the one or more available devices, one or more device indicators corresponding to the detected one or more available devices during the active communication session;

receiving, from an available device of the one or more available devices, an input selecting one of the displayed one or more indicators, during the active communication session;

causing to display a session identifier corresponding to the active communication session at a selected device associated with the selected one of the displayed one or more device indicators; and in response to receiving a session selection input from the selected device, routing transmissions related to the active communication session to the selected device.

13. The system of claim 12, wherein the memory stores further instructions that, when executed by the processor, cause:

in response to receiving the device selection input, causing a device indicator corresponding to the selected device to change.

14. The system of claim 12, wherein the memory stores further instructions that, when executed by the processor, cause:

receiving proximity information corresponding to one or more additional available devices;

causing to display one or more device identifiers corresponding to the one or more additional available devices during the active communication session; and wherein routing the transmissions to the selected device comprises routing the transmission to one of the one or more additional available devices.

15. The system of claim 12, wherein the memory stores further instructions that, when executed by the processor, cause:

in response to receiving the device selection input, determining media capabilities of the selected device; and wherein routing transmissions related to the active communication session comprise routing transmission based on the media capabilities of the selected device.

16. The system of claim 12, wherein the transmissions related to the active communication session comprise audio data, video data, or text data.

* * * * *